United States Patent
Yamamoto et al.

(10) Patent No.: US 8,094,213 B2
(45) Date of Patent: Jan. 10, 2012

(54) IMAGE PROCESSING APPARATUS, IMAGE PROCESSING METHOD, AND PROGRAM IN WHICH AN ORIGINAL IMAGE IS MODIFIED WITH RESPECT TO A DESIRED REFERENCE POINT SET ON A SCREEN

(75) Inventors: Kouji Yamamoto, Kanagawa (JP); Takafumi Hosoi, Tokyo (JP); Mitsuyasu Amano, Tokyo (JP); Eiichiro Morinaga, Tokyo (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 12/376,971

(22) PCT Filed: Aug. 24, 2007

(86) PCT No.: PCT/JP2007/066455
§ 371 (c)(1),
(2), (4) Date: Feb. 10, 2009

(87) PCT Pub. No.: WO2008/032545
PCT Pub. Date: Mar. 20, 2008

(65) Prior Publication Data
US 2010/0157101 A1    Jun. 24, 2010

(30) Foreign Application Priority Data
Sep. 13, 2006   (JP) .................................. 2006-248617

(51) Int. Cl.
*H04N 5/262* (2006.01)

(52) U.S. Cl. ..................................... 348/239; 348/240.2

(58) Field of Classification Search .................. 348/239, 348/240.2, 333.12; 382/255, 264
See application file for complete search history.

(56) References Cited

U.S. PATENT DOCUMENTS

| | | | | |
|---|---|---|---|---|
| 5,125,041 A * | 6/1992 | Kimura et al. | ................ | 382/162 |
| 5,751,376 A * | 5/1998 | Hirai | ............... | 348/579 |
| 6,925,210 B2 * | 8/2005 | Herf | ............... | 382/264 |
| 2010/0098350 A1 * | 4/2010 | Zimmer | ................ | 382/264 |
| 2010/0157101 A1 * | 6/2010 | Yamamoto et al. | .......... | 348/239 |

FOREIGN PATENT DOCUMENTS

JP    7 113961    12/1995

OTHER PUBLICATIONS

Endo, Etsuro, "Adobe PhotoshopAtoz", Shohan Dai 1 Satsu, BNN Bugnewsnetwork, pp. 44-46 and 103, (1993).
Uji, Akira, "Photoshop Filter Jiten Complete", Shohan Dai 1 Satsu, pp. 86-87, (1998).
European Search Report issued Sep. 6, 2011 in EP 07806041.5-2218/ 2063388 published May 27, 2009.
"Chapter 13: Transforming and retouching", In: Adobe: "Adobe Photoshop CS2 User Guide", 2005, Adobe Press, XP002657460, pp. 346-394.

* cited by examiner

*Primary Examiner* — Timothy J Henn
(74) *Attorney, Agent, or Firm* — Oblon, Spivak, McClelland, Maier & Neustadt, L.L.P.

(57) ABSTRACT

An image processing apparatus, an image processing method, and an image processing program in which a special effect that allows a subject to be modified so that the degree of modification increases with increasing distance from a reference point of an original image set on a screen is given to a captured image.

4 Claims, 7 Drawing Sheets

IMAGE PROCESSING APPARATUS, IMAGE PROCESSING METHOD, AND PROGRAM IN WHICH AN ORIGINAL IMAGE IS MODIFIED WITH RESPECT TO A DESIRED REFERENCE POINT SET ON A SCREEN

TECHNICAL FIELD

The present invention relates to an image processing apparatus, an image processing method, and a program in which an original image is modified with respect to a desired reference point set on a screen.

The present application claims priority based on Japanese Patent Application No. 2006-248617 filed in Japan on Sep. 13, 2006, and this application is incorporated herein by reference.

BACKGROUND ART

Hitherto, optical filters attached to lenses of cameras to restrict light entering the lenses have been used. Optical filters are generally used for the purpose of restricting a wavelength range of transmission light. In addition to such a purpose, some optical filters are used as means for giving effects (hereinafter referred to as special effects) that allow a subject to be modified with increasing distance from a reference point set on a screen. Such special effects include an effect (hereinafter referred to as a zooming modification effect) that allows a subject to be modified so as to look as if the subject is radially flowing with increasing distance from the reference point, and an effect (hereinafter referred to as a cyclone modification effect) that allows a subject to be modified so as to look as if the subject is spirally flowing with increasing distance from the reference point. Since optical filters for giving such special effects (hereinafter referred to as special-effect optical filters) are generally designed so that the reference point described above is placed at a center point on the screen, a desired point on the screen cannot be used as a reference point to give the special effects as described above. In addition, special-effect optical filters need to be attached to lenses of cameras only when special effects are to be given. Moreover, images captured when special-effect optical filters are attached to lenses of cameras suffer resolution degradation over entire screens thereof.

Furthermore, in computers, by executing image processing software, similar special effects can be given to captured image data of even images captured when the special-effect optical filters described above are not attached to lenses of cameras. Such image processing software can give a special effect to a processing-target image by setting a desired position on a screen as a reference point. Specifically, such image processing software converts image data into a plurality of images enlarged at different enlargement ratios with respect to a reference point. And, the image processing software superimposes the plurality of enlarged images on unprocessed image data to give a zooming modification effect to the original image.

Due to the improvement in processing capability of computation processing processors provided in digital cameras, image processing for giving a special effect that allows a subject to be modified with respect to a reference point, including a zooming modification effect, is performed not only in personal computers but also in digital cameras. That is, digital cameras have comparatively facilitated, due to the improvement in processing capability of computation processing processors thereof, not only the process of simply recording and displaying captured images but also the process of giving special effects to captured images. Meanwhile, in digital cameras, with the increase in the number of pixels of a captured image in order to meet a demand for high image quality, the amount of computation necessary to give an image effect to image data has also increased. Thus, due to the lower processing capability than personal computers, digital cameras have a problem in that the computation speed is also comparatively reduced with the increase in the amount of computation described above. In addition, digital cameras are mainly driven by battery power sources, and power consumption also increases with such an increase in the amount of computation, resulting in another problem in that the driving time is shortened.

In an image processing method described in Japanese Examined Patent Application Publication No. 7-113961, a high-brightness portion on a screen is detected and shifted in a predetermined direction with a signal corresponding to that portion being applied with a predetermined weight and is added with a brightness signal component to thereby give a cross filter effect, which is used as a special-effect optical filter, to an image. Using such image processing as described in Japanese Examined Patent Application Publication No. 7-113961, a plurality of pixel values of individual pixels are shifted and added so as to be increased with respect to a reference point, whereby a pseudo-zooming modification effect can be given to a captured image. In a case where a zooming modification effect is given to a captured image using such an image processing method, however, the amount of processing involved in the process of extracting a high-brightness point or the addition process, described above, increases in accordance with the number of pixels of the captured image. In such an image processing method, further, a pixel that is not extracted as a high-brightness pixel is not to be processed. In such an image processing method, therefore, no zooming modification effect can be given to a region composed of unextracted pixels.

DISCLOSURE OF INVENTION

Technical Problem

The present invention has been proposed in view of such a situation, and has a technical object to provide an image processing apparatus, an image processing method, and an image processing program in which a special effect that allows a subject to be modified so that the degree of modification increases with increasing distance from a reference point of an original image set on a screen is given to a captured image with a small amount of computation.

An embodiment of the present invention proposed in order to solve the technical object as described above provides an image processing apparatus including first setting means for setting, for an original image, a first image region including a reference point arbitrarily selected on a screen thereof, and a second image region other than the first image region on the screen; reducing means for reducing the original image by decimating pixels of image data thereof; second setting means for setting, for a reduced image obtained by the reducing means, a reference point of the reduced image corresponding to the reference point of the original image, a first reduced image region corresponding to the first image region, and a second reduced image region corresponding to the second image region; modifying means for modifying, within the reduced image obtained by the reducing means, an image in the second reduced image region set by the second setting means so that the degree of modification increases with increasing distance from the reference point of the reduced image; expanding means for expanding image data of the second reduced image region, of which the image has been modified by the modifying means, into the second image region by interpolating pixel values between individual pixels constituting the image data; and combining means for combining the image data expanded into the second image region by the expanding means with image data of the original image constituting the first image region, and outputting image data of an image that is modified so that the degree of modification increases with increasing distance from the reference point of the original image.

Further, another embodiment of the present invention provides an image processing method including setting, for an original image, a first image region including a reference point arbitrarily selected on a screen thereof, and a second image region other than the first image region; reducing the original image by decimating pixels of image data thereof; setting, for a reduced image obtained by the reducing, a reference point of the reduced image corresponding to the reference point of the original image, a first reduced image region corresponding to the first image region, and a second reduced image region corresponding to the second image region; modifying, within the reduced image obtained by the reducing, an image in the set second reduced image region so that the degree of modification increases with increasing distance from the reference point of the reduced image; expanding image data of the modified second reduced image region into the second image region by interpolating pixel values between individual pixels constituting the image data; and combining image data constituting the expanded second image region with image data of the original image constituting the first image region and outputting image data of an image that is modified so that the degree of modification increases with increasing distance from the reference point of the original image.

Further, another embodiment of the present invention provides a program causing a computer to execute an image process including a first setting step of setting, for an original image, a first image region including a reference point arbitrarily selected on a screen thereof, and a second image region other than the first image region; a reducing step of reducing the original image by decimating pixels of image data thereof; a second setting step of setting, for a reduced image obtained in the reducing step, a reference point of the reduced image corresponding to the reference point of the original image, a first reduced image region corresponding to the first image region, and a second reduced image region corresponding to the second image region; a modifying step of modifying, within the reduced image obtained in the reducing step, an image in the second reduced image region set in the second setting step so that the degree of modification increases with increasing distance from the reference point of the reduced image; an expanding step of expanding image data of the second reduced image region modified in the modifying step into the second image region by interpolating pixel values between individual pixels constituting the image data; and a combining step of combining image data constituting the second image region expanded in the expanding step with image data of the original image constituting the first image region, and outputting image data of an image that is modified so that the degree of modification increases with increasing distance from the reference point of the original image.

The present invention is intended to set two image regions for an original image, which is composed of a first image region and a second image region, apply a modification process only to a second reduced image region corresponding to the second image region to expand it into the second image region, and combine image data of the expanded second image region with image data of the original image constituting the first image region to output image data of an image that is modified so that the degree of modification increases with increasing distance from a reference point of the original image.

Accordingly, in the present invention, a first image region whose change due to a modification process is comparatively small is not subjected to a modification process, and therefore the amount of processing necessary to modify an original image can be reduced. In the present invention, furthermore, data of an image can be output in which only a second image region is subjected to a modification process while the resolution of the first image region is maintained at a resolution similar to that of the original image.

Still other technical objects of the present invention and specific advantages obtained by the present invention will become more apparent from the embodiment described below with reference to the drawings.

BRIEF DESCRIPTION OF DRAWINGS

FIG. 43 is a diagram showing a reduced image P2 obtained by reducing the original image P1 by performing a decimation process.

FIG. 63 is a diagram showing a special-effect image P4 obtained by applying an expansion process to the reduced image.

BEST MODE FOR CARRYING OUT THE INVENTION

A best mode for carrying out the present invention will be hereinafter described in detail with reference to the drawings.

Figure 1:
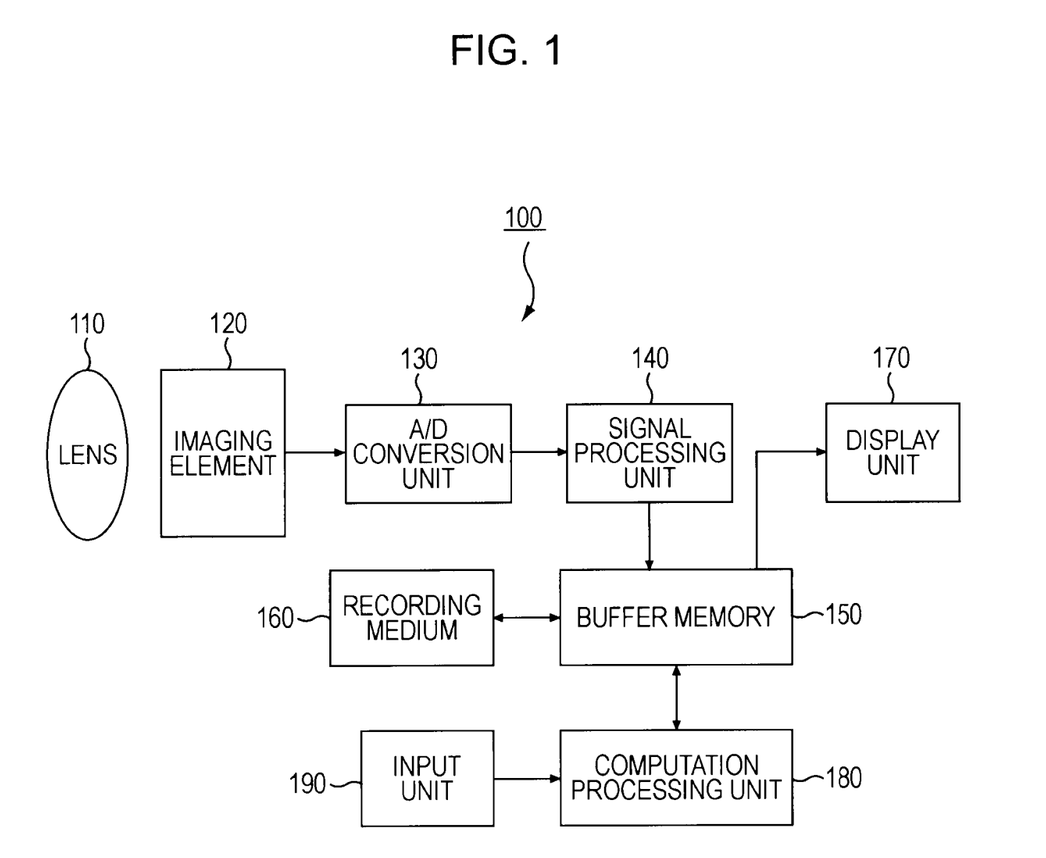
FIG. 1 is a block diagram showing a structure of a digital camera.

As shown in FIG. 1, a digital camera 100 according to the present embodiment includes an optical lens 110, an imaging element 120, an A/D conversion unit 130, a signal processing unit 140, a buffer memory 150, a recording medium 160, a display unit 170, a computation processing unit 180, and an input unit 190.

The optical lens 110 focuses light from a subject onto the imaging element 120 through an opening portion not shown in figures.

The imaging element 120 receives the light focused by the optical lens 110 and converts it into an electrical signal. Then, the imaging element 120 supplies the converted electrical signal to the A/D conversion unit 130. Note that the imaging element 120 may have a CCD structure or C-MOS structure and the structure thereof is not intended to be limited to a certain structure.

The A/D conversion unit 130 converts the electrical signal supplied from the imaging element 120 from an analog format to a digital format, and supplies the result to the signal processing unit 140.

The signal processing unit 140 applies predetermined signal processing to the digital electrical signal supplied from the A/D conversion unit 130 to produce image data. Specifically, the signal processing unit 140 applies signal processing such as white balance, gamma correction, and luminance-chrominance conversion to the digital electrical signal to produce image data. The signal processing unit 140 supplies the image data obtained by the signal processing to the buffer memory 150.

The buffer memory 150 temporarily stores the image data supplied from the signal processing unit 140, and supplies the stored image data to the recording medium 160, the display unit 170, and the computation processing unit 180.

The recording medium 160 records the image data supplied from the buffer memory 150. Further, the recording medium 160 also performs a process of reading the recorded image data to the buffer memory 150.

The display unit 170 displays the image data supplied from the buffer memory 150. Further, the display unit 170 also displays a GUI (Graphic User Interface) screen for operating the digital camera 100, as well as displaying an image captured using the digital camera 100.

The computation processing unit 180 controls the operation of the individual processing units provided in the digital camera 100. Specifically, the computation processing unit 180 controls the overall operation of the digital camera 100, including the imaging of a subject, the recording of image data, the displaying of image data, and so forth.

The input unit 190 is used as a user interface through which a user performs an operation input to the digital camera 100. For example, in response to an operation from the user in accordance with the GUI screen displayed on the display unit 170, the input unit 190 supplies an operation instruction corresponding to the operation input to the computation processing unit 180.

In the digital camera 100, furthermore, the computation processing unit 180 performs a process of giving a predetermined image effect to image data obtained by imaging a subject. In a case where such a process is to be performed, the computation processing unit 180 causes image data of a processing target to be read from the recording medium 160 to the buffer memory 150. Then, the computation processing unit 180 performs a process of giving a predetermined image effect to the image data read to the buffer memory 150. Thereafter, when the process for the image data of the processing target has been completed, the computation processing unit 180 causes the processed image data to be supplied to the recording medium 160 or the display unit 170 through the buffer memory 150. In this manner, the digital camera 100 also performs an image process of giving a predetermined image effect to image data in addition to the process of recording image data and the process of displaying image data. Note that in the digital camera 100, the computation processing unit 180 may give a predetermined image effect to the image data stored in the buffer memory 150 immediately after imaging is performed, as well as the image data stored in the storage medium 160, before the storage process to the storage medium 160 is performed.

In the present embodiment, of the image processes performed by the digital camera 100 described above, an image process of giving a special effect that allows a subject to be modified so that, with respect to captured image data, the degree of modification increases with increasing distance from a reference point set on a screen thereof to the image data recorded in the recording medium 160 will be mainly described as follows.

Figure 2A:
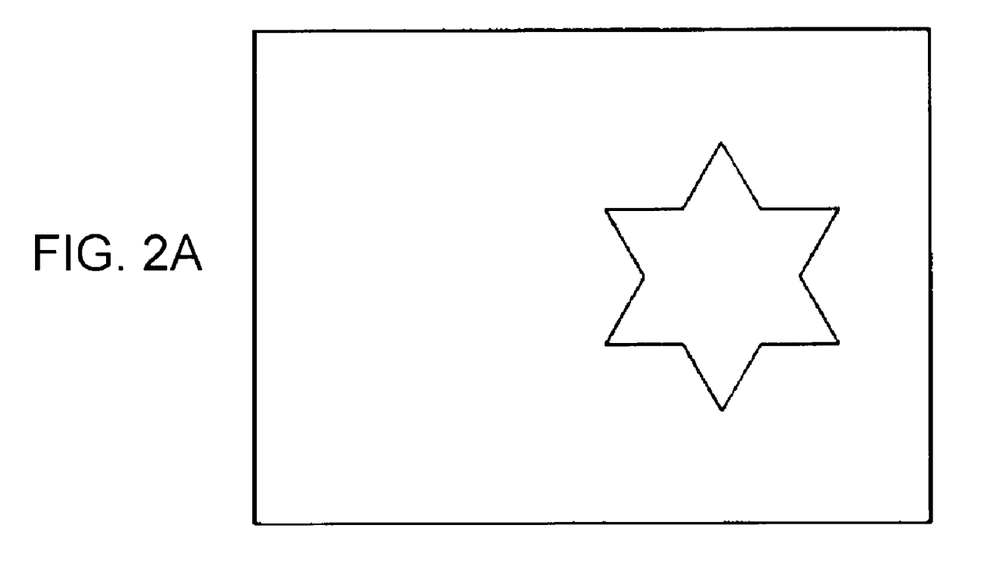
FIG. 2A is a diagram showing an original image.
Figure 2B:
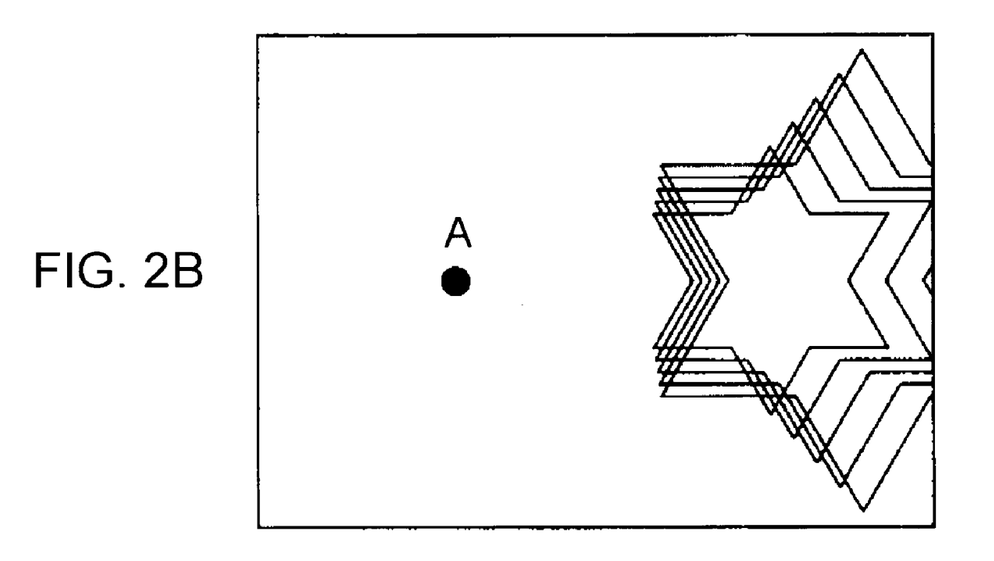
FIG. 2B is a diagram showing an image obtained by giving a zooming modification effect to an original image P1.

An example of giving such a special effect is shown in FIG. 2. Specifically, a process of giving an image effect (hereinafter referred to as a zooming modification effect) that allows a processing-target image (hereinafter referred to as an original image) shown in FIG. 2A to be modified so as to look as if the image is radially flowing with increasing distance from a reference point A as shown in FIG. 2B will be described.

Figures 3, 4A:
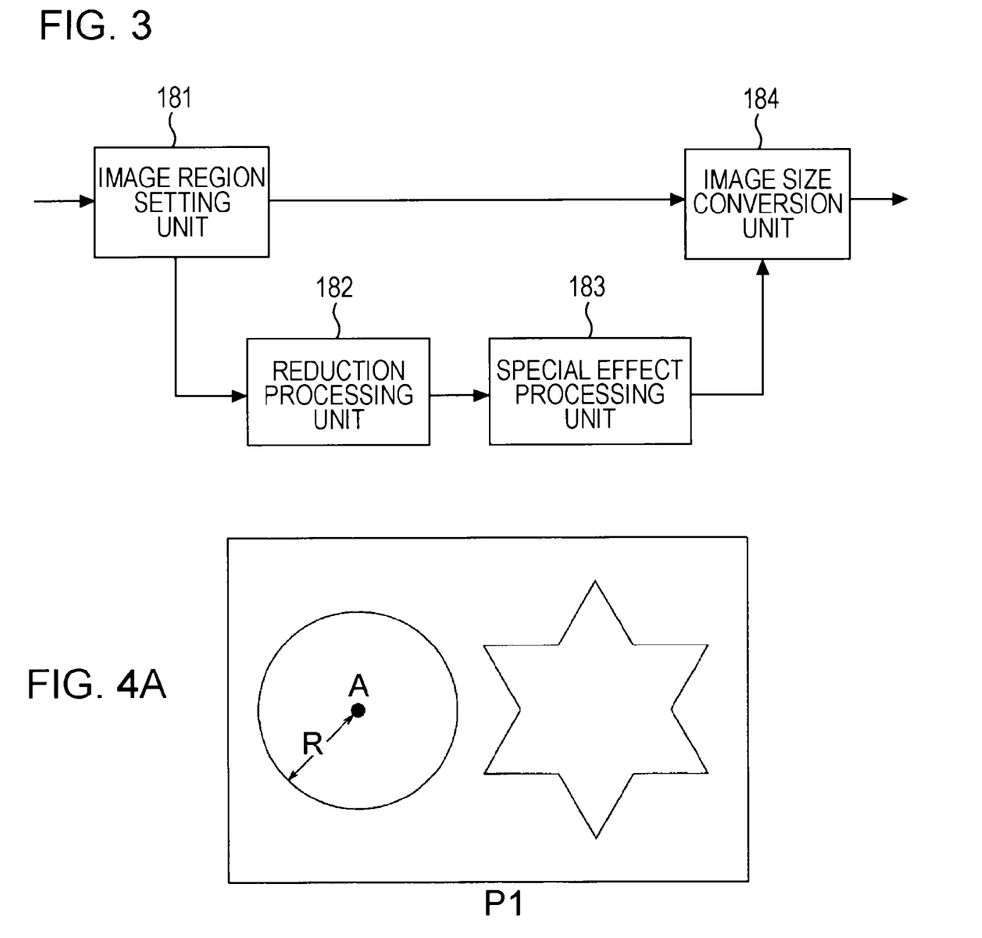
FIG. 3 is a block diagram showing a structure of a processing unit provided in a computation processing unit in order to apply a zooming modification effect.
FIG. 4A is a diagram showing the original image P1.

In the digital camera 100, in order to give the special effect described above to the original image, the computation processing unit 180 includes processing units as shown hereinbelow. As shown in FIG. 3, the computation processing unit 180 includes an image region setting unit 181, a reduction processing unit 182, a special effect processing unit 183, and an image size conversion unit 184.

The image region setting unit 181 sets, as shown in FIG. 4A, for an original image P1, a circular area on a screen thereof, which is centered on a reference point A and which has a radius R, as a first image region and a region other than the first image region on the screen as a second image region. Here, the reference point A is a point that is located at a desired position on the screen of the original image P1 and that is set, for example, by a user operating the input unit 190 with respect to the original image P1 displayed on the display unit 170. Likewise, the size of the radius R is also set by the user. Note that the reference point A and the radius R may not necessarily be set by the user's operation input in the manner described above and, for example, the reference point A and the radius R may be individually fixed. Then, the image region setting unit 181 supplies image data of the original image P1 and information concerning the image regions to each of the reduction processing unit 182 and the image size conversion unit 184.

Figure 4B:
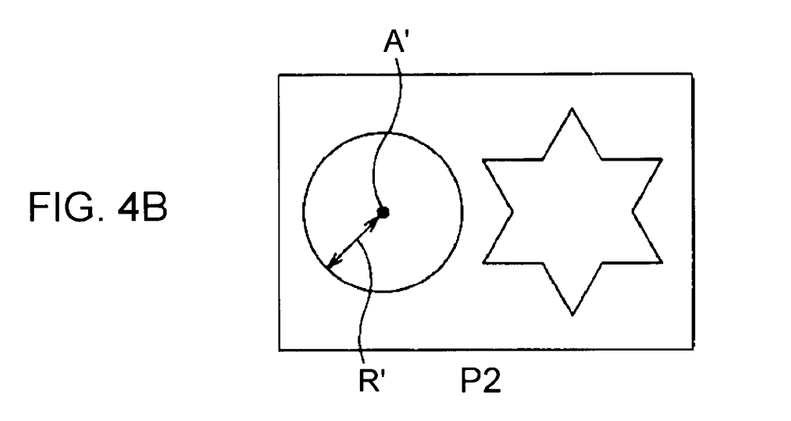

The reduction processing unit 182 converts the image data of the original image P1 supplied from the image region setting unit 181 into a reduced image P2 as shown in FIG. 43 by equally decimating pixel values of pixels constituting the image data. Thereafter, the reduction processing unit 182 supplies image data of the reduced image P2 to the special effect processing unit 183. Here, a reference point A' shown in FIG. 4B is a correspondence point obtained when the reference point A of the original image P1 is mapped onto a screen of the reduced image P2. Likewise, a radius R' shown in FIG. 43 has a value that is obtained by reducing the radius R of the original image P1 at a reduction ratio of the reduced image P2 to the original image P1. Note that since the reduction processing unit 182 merely performs a process of converting the original image P1 into the reduced image P2, the reference point A' and the radius R' are calculated by the special effect processing unit 183.

The special effect processing unit 183 applies a special effect process of giving a zooming modification effect, described below, to the image data of the reduced image P2 supplied from the reduction processing unit 182, and supplies image data of a reduced image P3 obtained after the process to the image size conversion unit 184.

Figures 5A, 5B:
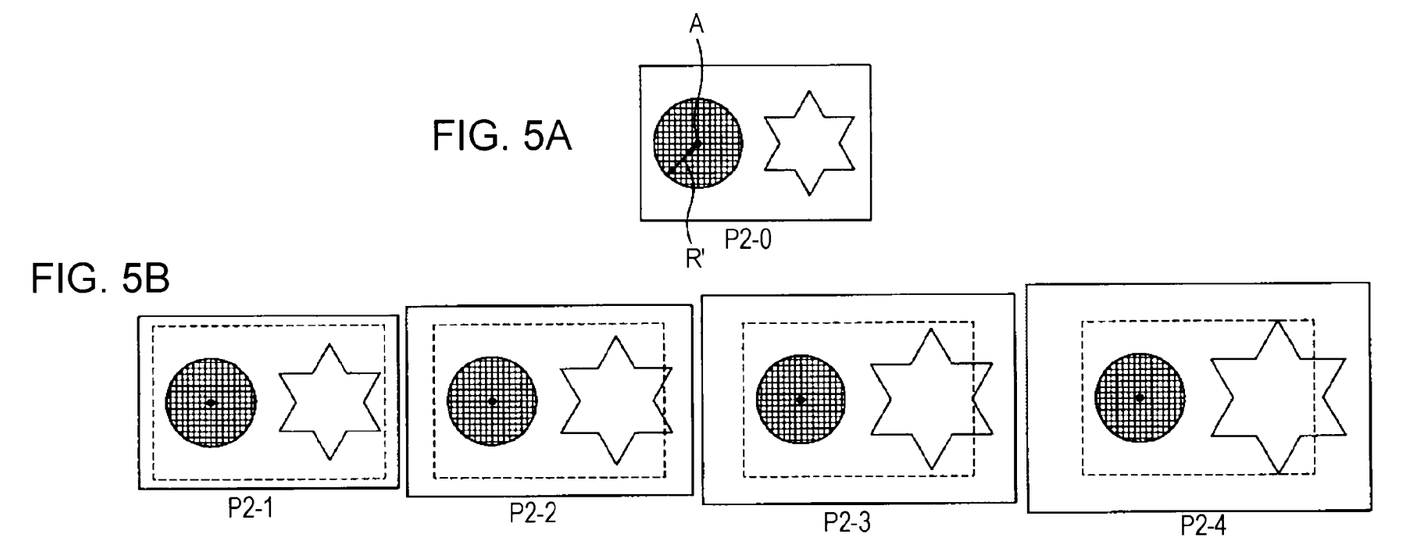
FIG. 5A is a diagram showing the reduced image P2.
FIG. 5B is a diagram showing enlarged images P2-1, P2-2, P2-3, and P2-4 obtained by applying an enlargement process to the reduced image P2.
Figure 5C:
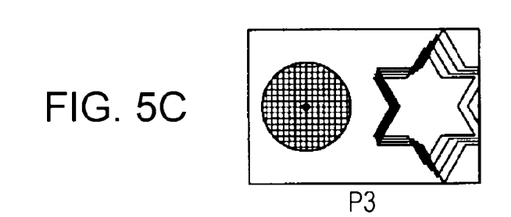
FIG. 5C is a diagram showing a reduced image P3 obtained by superimposing the enlarged images P2-1, P2-2, P2-3, and P2-4 on the reduced image P2.

FIG. 5 is a diagram schematically showing a process performed by the special effect processing unit 183.

The special effect processing unit 183 converts a reduced image P2 shown in FIG. 5A into enlarged images P2-1, P2-2, P2-3, and P2-4 obtained by enlarging a second reduced image region within the reduced image P2 at four different enlargement ratios α1, α2, α3, and α4 (α1<α2<α3<α4) as shown in FIG. 5B. Here, a range mapped from within the screen of the reduced image P2 is a range surrounded by a broken line shown in the figure within each of the enlarged images P2-1, P2-2, P2-3, and P2-4. Note that in the present embodiment, areas outside the regions surrounded by the broken lines are shown for the sake of convenience in order to schematically show an effect achieved by the enlargement process.

The special effect processing unit 183 overlaps the enlarged images P2-1, P2-2, P2-3, and P2-4 to produce a reduced image P3 that looks as if the reduced image P3 is radially flowing with increasing distance from the reference point A' in a manner shown in FIG. 5C.

Note that it is assumed that the number of enlarged images to be superimposed on the reduced image P2 is not limited to four as described above and that the special effect processing unit 183 selects a desired number of enlarged images to be superimposed in accordance with the desired zooming modification effect.

While the processing content relating to the special effect processing unit 183 on a screen-by-screen basis has been shown, a process for specifically executing such processing content will be described in the content of a process performed on a pixel-by-pixel basis.

The special effect processing unit 183 calculates the reference point A' and radius R' of the reduced image P2, which correspond to the reference point A and radius R of the original image P1, respectively. In order to separate the image data of the reduced image P2 into a reduced image region (hereinafter referred to as a first reduced image region) corresponding to the first image region and a reduced image region (hereinafter referred to as a second reduced image region) corresponding to the second image region, the special effect processing unit 183 performs a determination process shown hereinbelow on all pixels constituting the reduced image P2. The special effect processing unit 183 determines whether or not each of the pixels constituting the reduced image P2 is located, on the screen, in a circular region centered on the reference point A' and having the radius R' (image regions indicated by grid among the individual reduced images shown in FIG. 5). In this determination process, if it is determined that a pixel targeted for the determination is located in the circular area, the special effect processing unit 183 determines that the targeted pixel is one of pixels constituting the first reduced image region. If it is determined that the targeted pixel is located outside the circular area, the special effect processing unit 183 determines that the targeted pixel is one of pixels constituting the second reduced image region.

The special effect processing unit 183 sets a brightness value of a pixel determined to be located in the first reduced image region to 0. The special effect processing unit 183 further calculates a pixel value q(X, Y) of each of pixels constituting the reduced image P3 from a pixel value q(X0, Y0) of a pixel determined to be located in the second reduced image region. Here, (X0, Y0) represents coordinates of a processing-target image determined to be located in the second reduced image region of the reduced image P2. Further, (X, Y) represents coordinates of the reduced image P3. The specific processing content will be shown hereinbelow.

First, using a function F given in Equation (1) below, the special effect processing unit 183 inputs the coordinates (X0, Y0), coordinates (Xc, Yc) of the reference point A', an enlargement ratio α1, and a rotation angle θ, and outputs coordinates (X1, Y1) indicating the position of the reduced image P2 obtained after the enlargement process:

$$(X1, Y1) = F(X0, Y0, Xc, Yc, α1, θ)$$ Equation (1)

Note that the individual components at the coordinates (X1, Y1) after the enlargement process are given by Equations (2) and (3) below, respectively:

$$X1 = Xc + (1/α1) \times \{(X0 - Xc) \times \cos θ - (Y0 - Yc) \times \sin θ\}$$ Equation (2)

$$Y1 = Yc + (1/α1) \times \{(X0 - Xc) \times \sin θ + (Y0 - Yc) \times \cos θ\}$$ Equation (3)

Here, in the special effect process of giving a zooming modification effect, an image is modified so as to look as if the image is radially flowing with respect to a reference point. Thus, only an enlargement process is performed. Hence, it is assumed that the special effect processing unit 183 always sets the value of the rotation angle θ to 0 [rad] to give a zooming modification effect. Note that the special effect processing unit 183 sets the value of the rotation angle θ to a suitable value, whereby an effect can be given to an original image in which the image looks as if the image is spirally flowing with increasing distance from a reference point (hereinafter referred to as a cyclone modification effect).

The special effect processing unit 183 defines, for the coordinates (X0, Y0), a total of four enlargement ratios α1, α2, α3, and α4 (α1<α2<α3<α4) including the enlargement ratio α1 described above, and individually applies an enlargement process using the function F described above to calculate coordinates (X1, Y1), (X2, Y2), (X3, Y3), and (X4, Y4) indicating positions of reduced images P2 obtained after the enlargement process is performed.

The special effect processing unit 183 refers to pixels of the reduced images P2, which correspond to the calculated coordinates (X1, Y1), (X2, Y2), (X3, Y3), and (X4, Y4). Here, it is assumed that the special effect processing unit 183 refers to pixels of the reduced images P2, which are positioned nearest those coordinates. The special effect processing unit 183 individually reads the pixel values of the pixels referred to, and sets the pixel values of those pixels to q(X1, Y1), q(X2, Y2), q(X3, Y3), and q(X4, Y4). Here, in the technique of referring to the nearest positions described above, as compared with other alternative techniques, the amount of processing is small while the resolution is comparatively greatly degraded. In an image region sufficiently apart from a reference point, however, the resolution of the image region is largely reduced as a result of the application of a zooming modification effect. Thus, by referring to the nearest positions in the manner described above, the special effect processing unit 183 can reduce the amount of computation compared with other alternative techniques without taking the degradation in image quality into consideration.

Subsequently, the special effect processing unit 183 calculates a pixel value q(X, Y) of a pixel of the reduced image P3 using Equation (4) as follows:

$$q(X, Y) = \{q(X0, Y0) + q(X1, Y1) + q(X2, Y2) + q(X3, Y3) + q(X4, Y4)\}/5$$ Equation (4)

The special effect processing unit 183 performs the process given in Equations (1) to (4) on all pixels determined to be located in the second reduced image region, and supplies reduced-image data of the reduced image P3 composed of the first reduced image region where the brightness values of the pixels constituting the first reduced image region are set to 0 and the second reduced image region subjected to the zooming modification effect to the image size conversion unit 184.

Accordingly, in the special effect processing unit 183, the first reduced region within the reduced image P2 is not subjected to the process of giving a zooming modification effect as shown in FIG. 5. This is because even if the image process of giving a zooming modification effect is applied to the first reduced image region, as shown hereinbelow, a change in the image relative to that before the process is small compared with the second reduced image region.

The distance from each of the pixels constituting the first reduced image region to the reference point is shorter than the distance from each of the pixels constituting the second reduced image region to the reference point. Thus, the change in the coordinate position between before and after an enlargement process is smaller in the first reduced image region than in the second reduced image region. Therefore, when the change in a pixel value before the process of giving a zooming modification effect and the change in a pixel value calculated using Equation (4) are compared, the change in the first reduced image region is also smaller than that in the second reduced image region.

Accordingly, since the special effect processing unit 183 does not perform processing of the first reduced image region having a small zooming modification effect, the amount of computation processing can be reduced compared with a case where the process of giving a zooming modification effect is performed on all pixels constituting the reduced image. Thus, the special effect processing unit 183 can reduce the amount of processing required to modify the original image as compared with the related art.

Figure 6A:
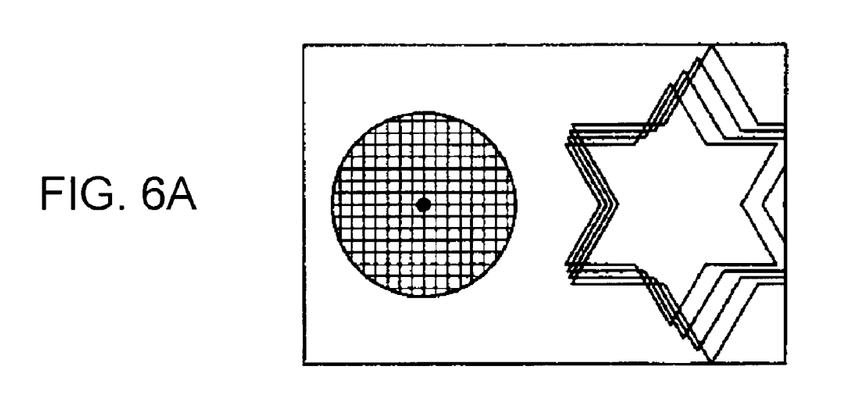
FIG. 6A is a diagram showing the reduced image P3.
Figure 6B:
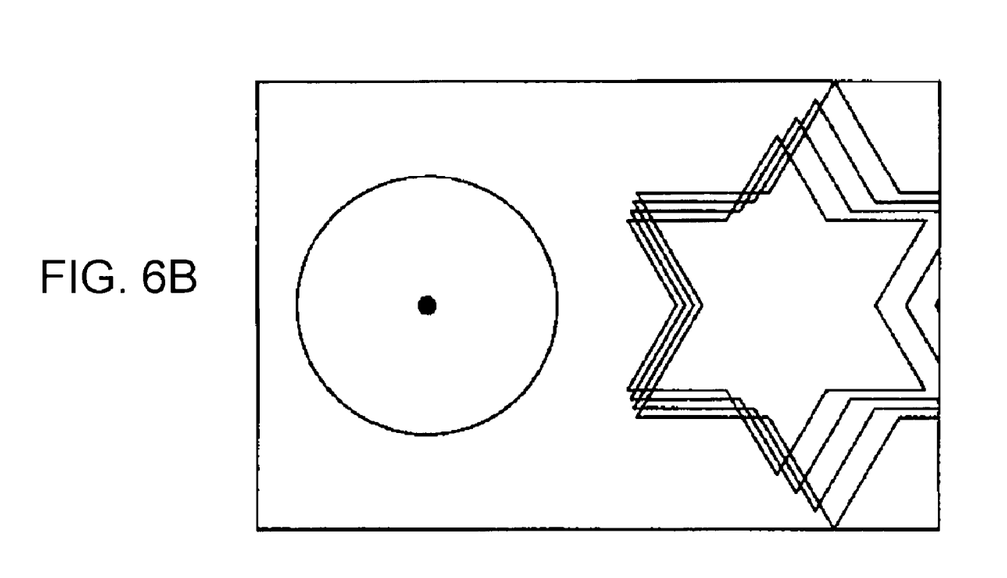

As shown in FIG. 6A, the image size conversion unit 184 applies a bilinear interpolation process described below only to the second reduced image region from the image data of the reduced image P3 supplied from the special effect processing unit 183 to expand the reduced image P3 to the original image size. The image size conversion unit 184 combines the image data corresponding to the second image region, which has been subjected to the expansion process by using bilinear interpolation, with the image data constituting the first image region (the image region indicated by grid in the figure) within the image data of the original image supplied from the image region setting unit 181 to produce a special-effect image P4 having the original image size as shown in FIG. 6B.

That is, the image size conversion unit 184 performs an interpolation process using the pixels only in the second reduced image region within the reduced image P3 supplied from the special effect processing unit 183, and uses the image data of the original image P1 for the remaining region. To this end, the image size conversion unit 184 performs a determination process shown hereinbelow.

First, the image size conversion unit 184 calculates coordinates of the reduced image P3 corresponding to coordinates of each of target pixels to be interpolated (hereinafter referred to as interpolation-target pixels) in the special-effect image P4. Then, the image size conversion unit 184 determines whether or not four pixels positioned around the calculated coordinates of the reduced image P3 are to be used as reference pixels.

Figure 7A:
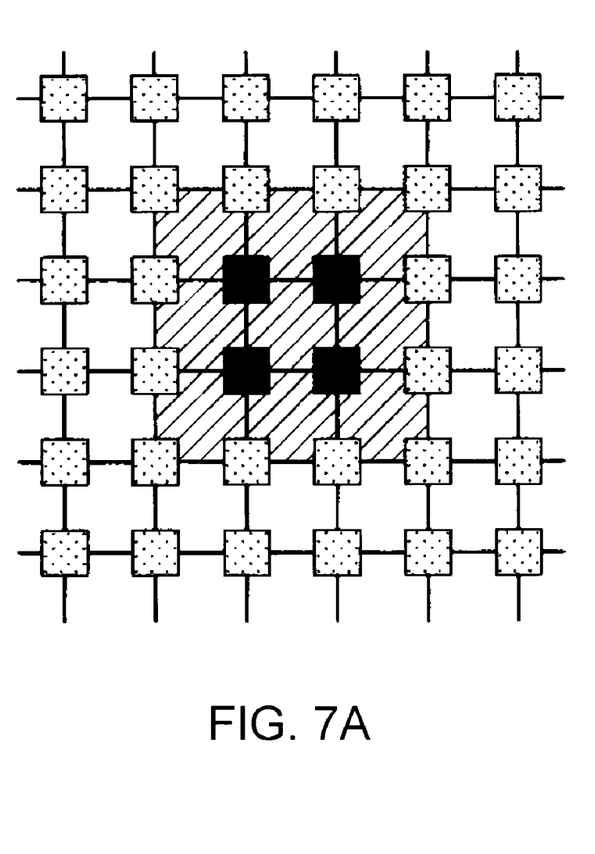
FIG. 7A is a diagram schematically showing a determination process of determining whether or not a bilinear interpolation process is to be performed.

Specifically, as shown in FIG. 7A, the image size conversion unit 184 determines whether or not at least one or more of those four reference pixels have a brightness value of 0. Here, reference pixels indicated by dotted lines in FIG. 7A are pixels having a brightness value of other than 0, and reference pixels indicated by black squares ("■") in FIG. 7A are pixels having a brightness value of 0. If it is determined using this determination process that at least one or more of the reference pixels have a brightness value of 0, the image size conversion unit 184 sets pixel values of interpolation-target pixels in a region indicated by hatching in FIG. 7A, which correspond to those reference pixels, to the values of the image data of the original image P1, which correspond to the pixel positions. The image size conversion unit 184 further calculates interpolation-target pixels located outside the region indicated by hatching in FIG. 7A, which correspond to reference pixels all of which are determined to have a brightness value of non zero, by using bilinear interpolation from the pixel values of the pixels constituting the reduced image P3. The image size conversion unit 184 preferentially uses the image data of the original image P1, rather than the image data of the reduced image P3, to set the pixel values of the pixels constituting the special-effect image P4. Therefore, the image size conversion unit 184 can perform the combining process described above, wherein the brightness value of a pixel near a boundary between the first image region and the second image region is not 0.

Next, the processing content of the bilinear interpolation process performed by the image size conversion unit 184 will be described in detail with reference to FIG. 7B.

Figure 7B:
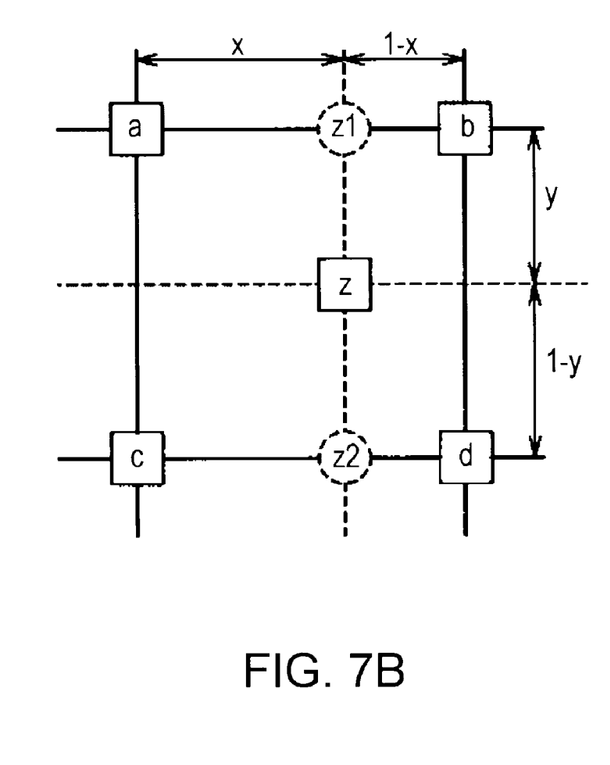
FIG. 7B is a diagram schematically showing the bilinear interpolation process.

As shown in FIG. 7B, the image size conversion unit 184 interpolates an interpolation-target pixel z from four reference pixels positioned therearound. In those four pixels, pixels at positions diagonally upward left, diagonally upward right, diagonally downward left, and diagonally downward right with respect to the interpolation-target pixel z are represented by a, b, c, and d, respectively.

Further, a pixel z1 at a position where a vertical extension passing through the interpolation-target pixel z and a horizontal line connecting the pixels a and b intersect each other is set, and the ratio of the distance from the pixel a to the pixel z1 to the distance from the pixel z1 to the pixel b is set to x: (1−x) (0≦x≦1). Likewise, if a pixel z2 at a position where the vertical extension passing through the interpolation-target pixel z and a horizontal line connecting the pixels c and d intersect each other is set, the ratio of the distance from the pixel c to the pixel z2 to the distance from the pixel z2 to the pixel d is x: (1−x). Further, the ratio of the distance from the pixel z1 to the pixel z to the distance from the pixel z to the pixel z2 is set to y: (1−y) (0≦y≦1).

The image size conversion unit 184 first calculates a pixel value P(z1) of the pixel z1 from Equation (5) below and calculates a pixel value (z2) from Equation (6). Note that it is assumed that the pixels a, b, c, and d have pixel values p(a), p(b), p(c), and p(d), respectively.

$$p(z1)=(1-x) \times p(a)+x \times p(b) \qquad \text{Equation (5)}$$

$$p(z2)=(1-x) \times p(c)+x \times p(d) \qquad \text{Equation (6)}$$

Then, the image size conversion unit 184 calculates a pixel value p(z) of the interpolation-target pixel z from Equation (7) using the calculation results from Equations (5) and (6).

$$p(z)=(1-y) \times p(z1)+y \times p(z2) \qquad \text{Equation (7)}$$

The image size conversion unit 184 performs the process described above on all the pixels constituting the special effect image P4.

Accordingly, the image size conversion unit 184 combines the image data corresponding to the second image region, which has been subjected to the expansion process by using bilinear interpolation, with the image data constituting the first image region among the original image data supplied from the image region setting unit 181 to produce the special effect image P4 having the original image size, and supplies the special effect image P4 to the image size recording medium 160 or the display unit 170.

Figure 8:
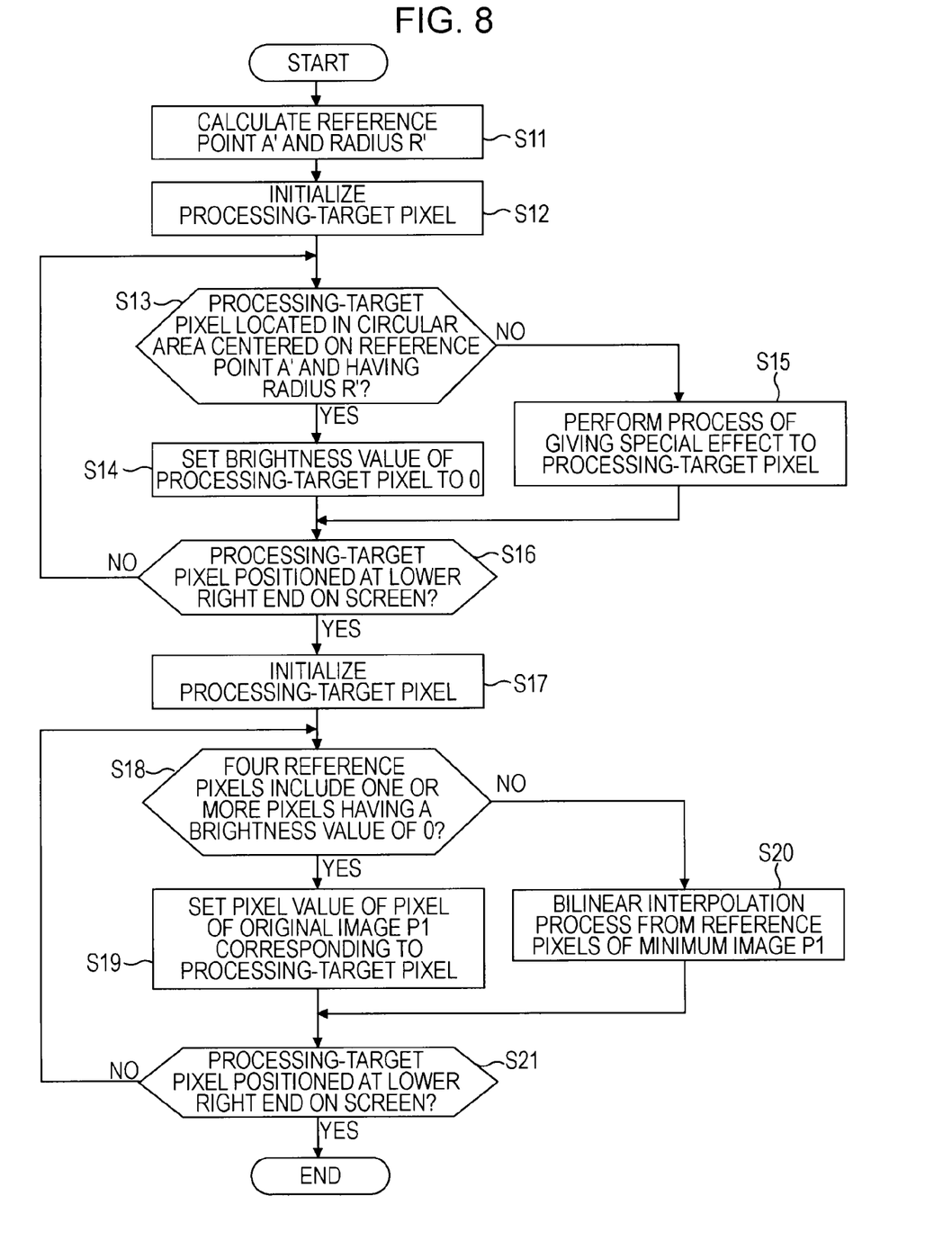
FIG. 8 is a flowchart showing processing steps of applying a zooming modification effect to the original image P1, which are performed by the computation processing unit.

Next, processing steps performed by the special effect processing unit 183 and the image size conversion unit 184 among the individual processing units provided in the computation processing unit 180 described above will be described with reference to a flowchart shown in FIG. 8. Note that the present processing steps are executed by the computation processing unit 180 by controlling the individual processing units according to an image processing program.

First, before the present processing steps start, it is assumed that the image region setting unit 181 has set, for the image data of the original image P1, the first image region defined in the circular area centered on the reference point A and having the radius R and the second image region outside the circular area. It is also assumed that the reduction processing unit 182 has converted the image data of the original image P1 into the image data of the reduced image P2 and has supplied the image data of the reduced image P2 to the special effect processing unit 183. Then, the following processing steps are initiated.

In step S11, the special effect processing unit 183 calculates the reference point A' and radius R' of the reduced image P2, which correspond to the reference point A and radius R of the original image P1, respectively.

In step S12, the special effect processing unit 183 sets, from the image data of the reduced image P2 supplied from the reduction processing unit 182, a pixel positioned at the upper left end on the screen thereof as a processing-target pixel.

In step S13, the special effect processing unit 183 determines whether or not the processing-target pixel is positioned in a circular area centered on the reference point A' and having the radius R'. Specifically, the special effect processing unit 183 performs the determination by determining whether or not the square of a distance between the coordinate position of the processing-target pixel and the coordinate position of the reference point A' is greater than or equal to the square value of the radius R. Here, if it is determined that the square value of the distance is greater than or equal to the square value of the radius R, the special effect processing unit 183 proceeds to step S14. If it is determined that the square value of the distance is less than the square value of the radius R, the special effect processing unit 183 proceeds to step S15.

In step S14, the special effect processing unit 183 sets the brightness value of the current processing-target pixel to 0. Thereafter, the special effect processing unit 183 proceeds to step S16.

In step S15, the special effect processing unit 183 applies the process of giving a zooming modification effect, which is given in Equations (1) to (4), to the current processing-target pixel to calculate the pixel values of the pixels constituting the reduced image P3. Thereafter, the special effect processing unit 183 proceeds to step S16.

In step S16, the special effect processing unit 183 determines whether or not the current processing-target pixel is positioned at the lower right end on the screen. If it is determined that the current processing-target pixel is positioned at the lower right end on the screen, the special effect processing unit 183 proceeds to step S17. If it is determined that the current processing-target pixel is not positioned at the lower right end on the screen, the special effect processing unit 183 shifts the position of a next processing-target pixel by one pixel in the scanning direction of the screen, and thereafter returns to step S13.

When step S16 is completed, a transition of the present processing steps from the process performed by the special effect processing unit 183 to the process performed by the image size conversion unit 184 is achieved.

In step S17, the image size conversion unit 184 sets the position of an interpolation-target pixel to the upper left end on a screen having the original size.

In step S18, the image size conversion unit 184 determines whether or not four reference pixels associated with the current interpolation-target pixel include one or more pixels having a brightness value of 0. If it is determined that those reference pixels do not include one or more pixels having a brightness value of 0, the image size conversion unit 184 proceeds to step S19. If it is determined that those reference pixels do not include a pixel having a brightness value of 0, the image size conversion unit 184 proceeds to step S20.

In step S19, the image size conversion unit 184 sets the pixel value of the interpolation-target pixel to be equal to the pixel value of a pixel of the original image P1, which corresponds to the interpolation-target pixel. Thereafter, the image size conversion unit 184 proceeds to step S21.

In step S20, the image size conversion unit 184 applies the bilinear interpolation process described above to the interpolation-target pixel using the pixel values of the reference pixels associated with the interpolation-target pixel. Thereafter, the image size conversion unit 184 proceeds to step S21.

In step S21, the image size conversion unit 184 determines whether or not the current processing-target pixel is positioned at the lower right end on the screen. If it is determined that the current processing-target block is located at the lower right end on the screen, the image size conversion unit 184 ends the present processing steps. On the other hand, if it is determined that the current interpolation-target pixel is not located at the lower right end on the screen, the image size conversion unit 184 shifts the position of a next processing-target pixel by one pixel in the direction where the screen is scanned, and thereafter returns to step S18.

Accordingly, the computation processing unit 180 applies a modification process only to the second reduced image region corresponding to the second image region according to the image processing program to perform expansion into the second image region, and combines the expanded image data of the second image region with the image data of the original image, which constitutes the first image region, thereby outputting image data of an image that is modified so that the degree of modification increases with increasing distance from a reference point of the original image.

Consequently, the computation processing unit 180 can give a zooming modification effect only to the second image region within the special effect image P4 while maintaining the resolution of the first image region in the special effect image P4 at a resolution similar to that of the original image P1.

Note that while in the present embodiment, an example of special effects has been described in the context of a process of giving a zooming modification effect to an original image, this is not to be construed in a limiting sense, and special effects that allow changes with respect to a reference point can be given to the original image, including a special effect that gives an effect to an original image so as to look as if the image is spirally flowing with respect to a reference point with increasing distance from the reference point.

Accordingly, the computation processing unit 180 does not apply a special effect to the first image region whose change is smaller than that of the second image region. Thus, the computation processing unit 180 can reduce the overall amount of computation processing while modifying the entire original image in a natural manner. Furthermore, in the digital camera 100 including the computation processing unit 180, due to such a reduction in the amount of computation processing, the operating time during the battery driving can be extended.

Note that the present invention is not to be limited only to the embodiment described above, and it is to be understood that a variety of modifications can be made without departing from the scope of the present invention.

The invention claimed is:

1. An image processing apparatus comprising:
a processor configured to:
set, for an original image, a first image region including a reference point arbitrarily selected on a screen thereof, and a second image region other than the first image region on the screen;
reduce the original image by decimating pixels of image data thereof;
set, for a reduced image obtained by reducing the original image, a reference point of the reduced image corresponding to the reference point of the original image, a first reduced image region corresponding to the first image region, and a second reduced image region corresponding to the second image region;
modify, within the reduced image, an image in the second reduced image region so that the degree of modification increases with increasing distance from the reference point of the reduced image;
expand image data of the second reduced image region, of which the image has been modified, into the second image region by interpolating pixel values between individual pixels constituting the image data;
combine the image data expanded into the second image region with image data of the original image constituting the first image region; and
output image data of an image that is modified so that the degree of modification increases with increasing distance from the reference point of the original image.

2. The image processing apparatus according to claim 1, wherein the processor is further configured to:
modify the second reduced image region by overlapping image data of the reduced image constituting the second reduced image region and image data obtained by applying an enlargement process or one of an enlargement process and a rotation process to the image in the second reduced image region.

3. An image processing method performed by an image processing apparatus, the image processing method comprising:
setting, by a processor of the image processing apparatus, for an original image, a first image region including a reference point arbitrarily selected on a screen thereof, and a second image region other than the first image region;
reducing, by the processor, the original image by decimating pixels of image data thereof;
setting, by the processor, for a reduced image obtained by the reducing, a reference point of the reduced image corresponding to the reference point of the original image, a first reduced image region corresponding to the first image region, and a second reduced image region corresponding to the second image region;
modifying, by the processor, within the reduced image obtained by the reducing, an image in the set second reduced image region so that the degree of modification increases with increasing distance from the reference point of the reduced image;
expanding, by the processor, image data of the modified second reduced image region into the second image region by interpolating pixel values between individual pixels constituting the image data; and
combining, by the processor, image data constituting the expanded second image region with image data of the original image constituting the first image region and outputting image data of an image that is modified so that the degree of modification increases with increasing distance from the reference point of the original image.

4. A non-transitory computer-readable medium including a program, which when executed by a computer, causes the computer to execute an image process comprising:
setting, for an original image, a first image region including a reference point arbitrarily selected on a screen thereof, and a second image region other than the first image region;
reducing the original image by decimating pixels of image data thereof;
setting, for a reduced image obtained by the reducing, a reference point of the reduced image corresponding to the reference point of the original image, a first reduced image region corresponding to the first image region, and a second reduced image region corresponding to the second image region;
modifying, within the reduced image, an image in the second reduced image region so that the degree of modification increases with increasing distance from the reference point of the reduced image;
expanding image data of the second reduced image region into the second image region by interpolating pixel values between individual pixels constituting the image data; and
combining image data constituting the expanded second image region with image data of the original image constituting the first image region, and outputting image data of an image that is modified so that the degree of modification increases with increasing distance from the reference point of the original image.

* * * * *